United States Patent [19]

Gytel

[11] 4,388,208
[45] Jun. 14, 1983

[54] ALUMINIUM SULPHATE COMPOSITION FOR WATER-PURIFYING, PAPER-SIZING AND PLANT DEWATERING PURPOSES AND A METHOD FOR PRODUCING THE COMPOSITION

[76] Inventor: Ulla B. Gytel, Villa Linnea, Ramlösa Brunns Park, S-25367 Helsingborg, Sweden

[21] Appl. No.: 357,176

[22] Filed: Mar. 11, 1982

[30] Foreign Application Priority Data

Mar. 23, 1981 [SE] Sweden ............................... 8101830

[51] Int. Cl.$^3$ ........................... C02F 5/02; C02F 5/08; C01F 7/74
[52] U.S. Cl. .................................... 252/175; 252/181; 423/556
[58] Field of Search ................. 252/175, 181; 423/556

[56] References Cited

U.S. PATENT DOCUMENTS 3,338,828  8/1967  Clark .................................... 252/181
3,544,476  12/1970  Aiba et al. ........................... 423/556

FOREIGN PATENT DOCUMENTS 78051356  5/1978  Sweden.
76077825  8/1981  Sweden.
 1548620  7/1979  United Kingdom.

Primary Examiner—John E. Kittle
Assistant Examiner—Robert A. Wax

[57] ABSTRACT

The invention relates to an aluminium sulphate composition for water-purifying, paper-sizing and plant-dewatering purposes, the composition comprising an aqueous solution of aluminium sulphate containing polynuclear complexes of the kind $$Al_m(OH)_n{(3m-n)+}$$

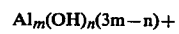

in which m and n are positive integers. The composition has a total aluminium content, $Al_{tot}$, of between about 0.2 and about 2 moles per liter, and is a clear, stable solution up to a content of polynuclear complexes which greatly exceeds that previously thought possible.

The invention also relates to a method for producing the composition, in which method a carbonate or hydrogen carbonate of alkali metal and an aluminium sulphate is brought into aqueous solution and the amount of carbonate or hydrogen carbonate is so selected in relation to the amount of aluminium sulphate that a given highest mole ratio OH/Al is obtained in the aqueous solution at the desired predetermined total aluminium content of the solution.

9 Claims, 1 Drawing Figure

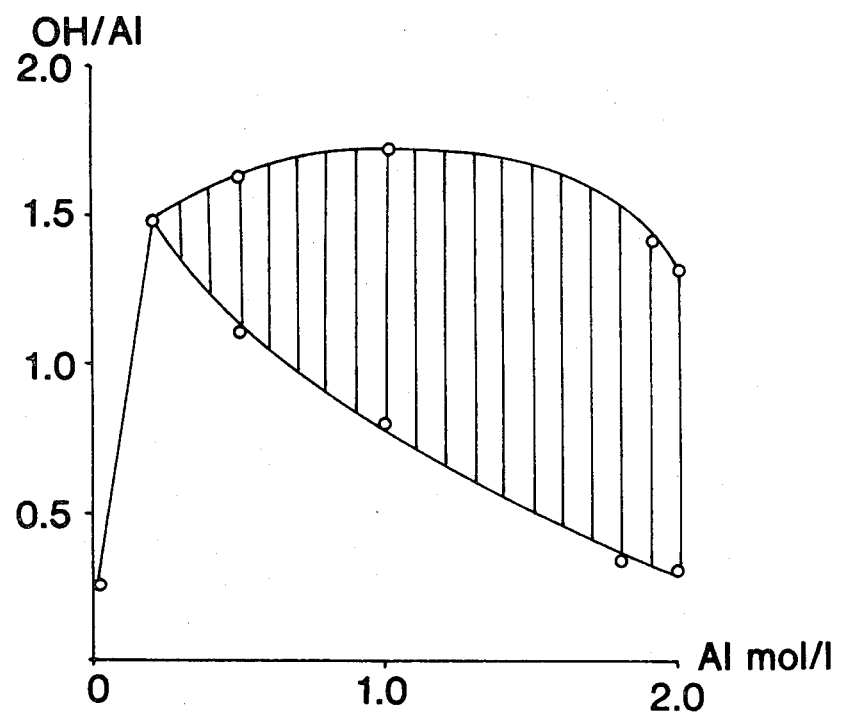

ALUMINIUM SULPHATE COMPOSITION FOR WATER-PURIFYING, PAPER-SIZING AND PLANT DEWATERING PURPOSES AND A METHOD FOR PRODUCING THE COMPOSITION

DESCRIPTION

1. Technical Field

The present invention relates to an aluminium sulphate composition for water-purifying, paper-sizing and plant de-watering purposes, said composition comprising an aqueous aluminium sulphate solution including a polynuclear complex of the kind $$Al_m(OH)_n^{(3m-n)+}$$

in which m and n are positive integers.

2. Background of the Invention

When alkali is added to an aluminium sulphate solution, the pH of the solution increases and complex aluminium-hydroxide ions are formed. These ions comprise partly those mononuclear, $Al(OH)^{2+}$ and $Al(OH)_2^+$, and polynuclear ions, which can be represented by the formula $Al_m(OH)_n^{(3m-n)+}$, in which m and n can take varying values, but in which the ratio n/m normally lies in the range 2.3-2.7.

EP,A1, 0005 419 describes aluminium sulphate solutions containing complex ions, and a method of producing the solutions and their use.

It will be apparent from this, our earlier publication, that every effort is made to obtain the highest possible content of polynuclear complexes, since the more polynuclear ions contained by the solution the greater the influence on the effectiveness on the aluminium sulphate in a positive sense. Thus, ions having a high charge have a much higher coagulating effect than ions having a lower charge within the fields of use intended here, which explains why alkalized aluminium sulphate solutions containing polynuclear complexes are more effective than non-alkalized aluminium sulphate solutions. The later published EP.A1. 0017 634 describes a solid flocculating agent in the form of a composition containing an aluminium sulphate component and an alkaline component, which agent, when dissolved, gives a clear solution having the desired pH and containing a limited amount of polynuclear complexes.

Thus, it is given in our earlier publications that the maximum pH-value which can be obtained in the solution without precipitating aluminium hydroxide depends upon the total amount of aluminium present in the solution. The higher the pH which can be tolerated with respect to firstly precipitation and secondly the stability of the solution, the higher the amount of alkali which can be added, and therewith the greater the amount of polynuclear complexes obtainable in the solution. It is stated in the said earlier publications that with 0.2 mole of aluminium per liter the maximum pH is 4.5, corresponding to a requisite OH/Al ratio of 1.5. With the highest practical aluminium concentration of the solution, 2.0 moles per liter, the maximum pH is said to be 2.9, and that this corresponds to a requisite OH/Al ratio of about 0.3. This means that within the range of 0.2-2.0 mole Al per liter, the percentage of polynuclear complexes in the solution decreases progressively with an increasing aluminium content of said solution. The values given in our aforementioned earlier publications with respect to the maximum OH/Al ratios in question can be approximated, within said range, to an expression giving the amount of aluminium present in the form of polynuclear complexes, which expression can be written as $0.10+0.1.Al_{tot}$ moles per liter, which means that the amount of aluminium present as polynuclear complexes decreases with the total aluminium content in accordance with: $0.10/Al_{tot}+0.10$.

According to said earlier publications a maximum percentage of polynuclear complexes is obtained when the total aluminium content of the solution is 0.2 mole. With this total content the percentage is thus 0.60, i.e. 60% of the aluminium ions are bound in the solution as polynuclear complexes. When the total aluminium content lies close to the upper limit of the range, i.e. 2 moles per liter, the highest percentage of polynuclear complexes obtainable is about 10%. Consequently, at the date of our earlier publications it was believed impossible to produce clear and stable solutions from solutions which contained large quantities of alkali, i.e. large quantities of polynuclear complexes.

DISCLOSURE OF THE PRESENT INVENTION

By "stable solution" is meant here and in the following a solution which is not changed with respect to composition and properties when stored and transported, even when stored for long periods of time or transported over long distances. In conjunction with arriving at the present invention it was surprisingly found possible to produce clear, stable compositions having substantially higher contents of polynuclear complexes than was previously said to be possible, when the alkalizing agent used is a carbonate or hydrogen carbonate of alkali metal or ammonium ions. Thus, the term alkali metal as used hereinafter also includes ammonium ions. The aluminium sulphate composition according to the invention is thus a solution containing polynuclear complexes of the kind $$Al_m(OH)_n^{(3m-n)+}$$

which is characterized in that it has a total aluminium content, $Al_{tot}$, between about 0.2 and about 2 moles per liter; and that it is a clear, stable solution up to a polynuclear complex content determined by the associated values:

| $Al_{tot}$ | % Al as polynuclear complexes |
|---|---|
| 0.2 | 60–60 |
| 0.5 | 30–64 |
| 1.0 | 20–68 |
| 1.9 | 15–60 |
| 2.0 | 15–56 |

Although it has not been fully established why carbonates and hydrogen carbonates of alkali metals have this favourable effect on aluminium sulphate solutions which contain polynuclear complexes, it is supposed that the solution contains residual trace quantities of carbonate, which stabilize the resultant polynuclear complexes in a favourable manner. It is possible in accordance with the invention to produce clear, stable solutions having an aluminium content in the form of said polynuclear complexes of about 50–70%.

The invention also relates to a method for producing said composition, said method being characterized by bringing a carbonate or hydrogen carbonate of alkali metal and an aluminium sulphate in aqueous solution; selecting the amount of aluminium sulphate used so as to obtain in the solution a given total aluminium content of between about 0.2 and about 2 moles per liter; and by selecting the amount of carbonate or hydrogen carbonate used in relation to the amount of aluminium sulphate used so that the ratio between the number of moles of OH and the number of moles of aluminium in the resultant solution does not appreciably exceed the value determined by the associated values:

| Mole Al per liter | Mole Ratio OH/Al |
| --- | --- |
| 0.2 | 1.5 |
| 0.5 | 1.6 |
| 1.0 | 1.7 |
| 1.9 | 1.5 |
| 2.0 | 1.4 | and is not below the value determined by the associated values:

| Mole Al per liter | Mole Ratio OH/Al |
| --- | --- |
| 0.2 | 1.5 |
| 0.5 | 1.1 |
| 1.0 | 0.8 |
| 1.9 | 0.35 |
| 2.0 | 0.3 |

The single FIGURE of the drawing accompanying this specification shows a diagram in which the mole ratio OH/Al, which is thus proportional to the amount of polynuclear complexes contained by the solution, is plotted as a function of the total aluminium content in mole per liter. The upper curve drawn in the diagram corresponds to the aforementioned associated values, as is also evident from Claim 3. Thus, the upper curve restricts the area within which clear, stable solutions containing polynuclear complexes can be obtained in accordance with the present invention. The lower curve corresponds to the associated values which restricted the amount of polynuclear complexes in solutions according to our earlier publications. The hatched area between these curves in the range 0.2-2 mole aluminium per liter thus corresponds to the increased range for aluminium sulphate solutions having polynuclear complexes afforded by the present invention. No improvement is obtained with total aluminium contents lower than 0.2 mole per liter, and hence the present invention has been restricted to total contents lying within the range 0.2-2 mole per liter aluminium. As previously indicated, the mole ratio OH/Al is also a measure of the amount of aluminium present in polynuclear complex form calculated on the total aluminium content of the solution. Since the majority of polynuclear complexes have been found to have a ratio n/m of about 2.5, the figures for the mole ratio OH/Al can be calculated approximately as the amount of aluminium present as polynuclear complexes by dividing by 2.5, the percentage being obtained by multiplying this quotient by 100, or by multiplying the mole ratio by 40. The lower curve in the diagram corresponds to the following associated values:

| Mole Al per liter | Mole Ratio OH/Al |
| --- | --- |
| 0.2 | 1.5 |
| 1.5 | 1.1 |
| 1.0 | 0.8 |
| 1.8 | 0.35 |
| 2.0 | 0.3 |

In our earlier publications, the figure given for the OH/Al ratio at 0.02 mole Al per liter has erroneously been made too high by one power of ten. This was due to a calculating error and the figure should actually be 0.25, this figure having been drawn into the diagram.

In the method of producing the composition, the carbonate or hydrogen carbonate and aluminium sulphate can be brought into an aqueous solution in a number of ways. For example, solid aluminium sulphate can be dissolved in water and the carbonate or hydrogen carbonate added to the solution, suitably while vigorously stirring the solution, so as to cause resultant carbon dioxide to rapidly leave the solution. An alternative, often preferred method is one in which the carbonate or the hydrogen carbonate and the aluminium sulphate are dissolved in solid form substantially simultaneously. This method enables the main components of the aluminium sulphate composition, namely carbonate or hydrogen carbonate and aluminium sulphate, to be stored and transported in that form prior to being used to produce the aluminium sulphate composition. In the latter case it is advantageous to mix the carbonate or the hydrogen carbonate and the aluminium sulphate in solid form in a mixing vessel in predetermined proportions, and to dissolve the resultant mixture in water. When applying this method the components are much easier to handle, and it is only necessary for the user to dispense the single solid product to the water and dissolve said product therein. In this latter case it is particularly advantageous to agglomerate the mixture, preferably by compacting or granulating the same, since each granule will contain the components in approximately said given proportions, even when the agglomerates are shaken, for example during transportation. If the mixed product is not agglomerated, there is a risk of the finer fractions separating from the coarser fractions. Various methods of agglomerating the components are discussed and described in more detail in EP; Al, 0017 634, these methods also being applicable in the case of those proportions between the components which can be permitted when applying the method according to the present invention.

The aluminium sulphate composition according to the present invention affords an important technical step forward, when compared with previously known compositions. Because solutions can be produced having an aluminium content as polynuclear complexes of more than 50% in the whole of the aluminium-content range which can be applied in practice, a high degree of selectivity is obtained with respect to the choice of solution concentrations. Because the aluminium sulphate solution can be made more concentrated with respect to aluminium, without detracting from the percentage of polynuclear complexes in the solution, the value of the resultant solutions is so high as to justify the transportation of ready solutions over longer distances. Among the aforesaid fields of application it can be mentioned that in the case of water purification the novel solutions provide a better purifying effect in purely general flocculating operations, i.e. there is obtained lower residual impurity contents, and more rapid flocculation, i.e. the water is purified more quickly. The results obtained in the other mentioned fields of applications are also considerably improved by the increased percentage of polynuclear complexes, which will be evident from what has been said in our earlier publications with respect to the significance of polynuclear complexes in paper-sizing and plant-dewatering operations.

The invention will now be described in more detail with reference to examples of the manufacture and use of a composition having an OH/Al ratio of 1.7, i.e. a ratio which is higher than that previously thought possible with respect to these compositions. It will be noted here that the following examples do not limit the invention in any way.

EXAMPLE 1

67.2 grams of $Na_2CO_3$ were mixed in dry state with 232.8 grams of granular aluminium sulphate. The mixture was added to 700 ml water and dissolved while being stirred with a magnetic stirrer for 60 minutes, while generating carbon dioxide, whereafter a clear solution was obtained. The solution had a volume of 824 ml and a density of $\rho=1.18$, and contained 0.90 mole Al per liter, of which 68% was present as polynuclear complexes.

EXAMPLE 2

In an analogous way the following polyaluminium compounds were prepared.

| $Al_{tot}$ | $\rho$ | % Al as polynucleate |
|---|---|---|
| 0.5 | 1.10 | 64 |
| 0.8 | 1.15 | 68 |
| 1.25 | 1.22 | 68 |
| 1.9 | 1.33 | 60 |
| 2.0 | 1.33 | 56 |

EXAMPLE 3

In comparison tests carried out on a laboratory scale, water originating from a flue-gas washing plant was purified in a beaker having a capacity of 1 liter. The amount of precipitating agent added corresponded to 0.32 mole $Me^{3+}$ per liter of washing water. The turbidity of the water expressed in Jackson Turbidity Units (JTU) was used as a measure of the purifying result. The washing water to be purified had a pH of 6.7 and a turbidity expressed as JTU>1000, i.e. above the measurable range for said test. The different precipitation-agent solutions were added in the aforementioned amounts. In a first test Boliden AVR was added, i.e. a solution of commercially available ion-containing aluminium sulphite without alkalization. After having undergone this purifying process, the water had a pH of 5.7 and a turbidity of 4.2. In test two an alkalized aluminium-sulphate solution (FALS) according to our earlier publications was added. The solution contained 0.32 moles Al per liter and had been alkalized to an OH/Al ratio of 1.2 with sodium hydroxide. This meant that the solution contained 48% of the aluminium ions bound as polynuclear complexes. When purifying the water with said alkalized solution there was obtained a pH of 6.2 and a turbidity of 3.7. In test three there was added the modified aluminium sulphate solution from example 1, having an aluminium content of 0.90 mole per liter and having been alkalized to an OH/Al-ratio of 1.7, in which 68% of the aluminium present was thus in the form of polynuclear complexes. The pH of the purified water did not fall to a level lower than 6.4, while the turbidity fell as low as 2.9, which thus indicates a substantial improvement in the purifying effect, both with respect to AVR and with the alkalized sulphate solution (FALS).

In order to increase the stability further of the polyaluminium complexes of the present invention they may be provided with a stabilizing agent from the group consisting of sodium heptonate, α-hydroxycarboxylic acids, such as citric acid, and tartaric acid, α-aminocarboxylic acids such as glutaric acid; and sodium acetate.

The amount of stabilizer can be varied considerably, whereby e.g. 1–2% of sodium heptanate can be used and 1/25–1/6 mole per mole of Al when citric acid is used.

EXAMPLE 4

7.0 g of citric acid, 27.5 g of $Na_2CO_3$, and 60 g of $AlSO_4.14H_2O$ were dissolved in 150 ml of water at ambient temperature. The compounds thereby dissolve under simultaneous $CO_2$-development to a semi-clear liquid, which is diluted to 200 ml, having a density of 1.21. The solution contains 1.0 mol Al/liter. 84% of the aluminium were present as polynuclear complexes.

It has been established experimentally that the maximum OH/Al ratio to be obtained while still having Al in polynuclear form is 2.1. At a ratio of 2.2 between OH/Al the system collapses forming an aluminium hydroxide precipitate.

I claim:

1. An aluminium sulphate composition for water-purifying, paper-sizing retention of filler and fibers in papermaking and plant-dewatering purposes, comprising an aqueous solution of aluminium sulphate containing polynuclear complexes of the kind $$Al_m(OH)_n^{(3m-n)+}$$

in which m and n are positive integers, characterized in that said composition has a total aluminium content, $Al_{tot}$, of between about 0.2 and about 2 mole per liter; and that it is a clear, stable solution comprising polynuclear complexes determined by the associated values

| Mole Al per liter | Mole Ratio OH/Al |
|---|---|
| 0.2 | 1.5 |
| 0.5 | 1.1–1.6 |
| 1.0 | 0.8–1.7 |
| 1.9 | 0.35–1.5 |
| 2.0 | 0.3–1.4 |

2. A composition according to claim 1, characterized in that approximately 50–70% of the aluminium content is present as said polynuclear complexes.

3. A method for producing the composition according to claim 1 or claim 2, characterized by bringing a carbonate or hydrogen carbonate of alkali metal and an aluminium sulphate into aqueous solution; selecting the amount of aluminium sulphate so as to obtain in the solution a given total aluminium content of between about 0.2 and about 2 mole per liter; and selecting the amount of carbonate or hydrogen carbonate used in relation to the amount of aluminium sulphate used so that the ratio between the number of moles of OH and the total number of moles of aluminium in the resultant solution does not substantially exceed the value determined by the associated values:

| Mole Al per liter | Mole Ratio OH/Al |
|---|---|
| 0.2 | 1.5 |
| 0.5 | 1.6 |
| 1.0 | 1.7 |
| 1.9 | 1.5 |
| 2.0 | 1.4 | and is not below the value determined by the associated values

| Mole Al per liter | Mole Ratio OH/Al |
|---|---|
| 0.2 | 1.5 |
| 0.5 | 1.1 |
| 1.0 | 0.8 |
| 1.9 | 0.35 |
| 2.0 | 0.3 |

4. A method according to claim 3, characterized in that the aluminium sulphate is dissolved in solid form in water, whereafter the carbonate or hydrogen carbonate is added to the solution.

5. A method according to claim 3, characterized in that the carbonate or hydrogen carbonate and the aluminium sulphate in solid form are dissolved in water substantially simultaneously.

6. A method according to claim 5, characterized in that the carbonate or hydrogen carbonate and the aluminium sulphate in solid form are mixed in a mixing vessel in given proportions; and that the resultant mixture is dissolved in water.

7. A method according to claim 1, characterized in that the mixture is agglomerated, preferably by compaction or granulation.

8. A composition according to claim 1, characterized in that it further contains a compound of the group consisting of sodium heptonate, $\alpha$-hydroxycarboxylic acid, $\alpha$-aminocarboxylic acid, and sodiumacetate as a stabilizing agent for the polynuclear complex.

9. A composition according to claim 8, characterized in that the content of stabilizing agent is 1–15% of the weight of the polyaluminium complex.

* * * * *